US009971353B2

(12) United States Patent
Tripathi et al.

(10) Patent No.: US 9,971,353 B2
(45) Date of Patent: May 15, 2018

(54) SYSTEMS, METHODS, AND APPARATUS RELATED TO ELECTRIC VEHICLE PARKING AND WIRELESS CHARGING

(71) Applicant: QUALCOMM Incorporated, San Diego, CA (US)

(72) Inventors: Manish Tripathi, San Diego, CA (US); Rao S. Yenamandra, San Diego, CA (US); Naidu S. Mullaguru, San Diego, CA (US); Edward L. Van Boheemen, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 13/932,995

(22) Filed: Jul. 1, 2013

(65) Prior Publication Data
US 2014/0012448 A1    Jan. 9, 2014

Related U.S. Application Data

(60) Provisional application No. 61/667,924, filed on Jul. 3, 2012.

(51) Int. Cl.
*G05D 1/02* (2006.01)
*B60L 11/18* (2006.01)
*H02J 7/00* (2006.01)

(52) U.S. Cl.
CPC .......... *G05D 1/0276* (2013.01); *B60L 11/182* (2013.01); *B60L 11/1827* (2013.01);
(Continued)

(58) Field of Classification Search
CPC ... Y02T 10/7005; Y02T 90/128; Y02T 90/14; Y02T 90/121; Y02T 90/163;
(Continued)

(56) References Cited

U.S. PATENT DOCUMENTS 5,563,491 A  * 10/1996  Tseng ................. B60L 11/1816
                                                    194/904
2003/0204743 A1 * 10/2003 Devadas ................. G06F 21/31
                                                    726/9
(Continued)

FOREIGN PATENT DOCUMENTS

CN         101952137 A      1/2011
DE     102009028968 A1      3/2011
(Continued)

OTHER PUBLICATIONS 1-page printed on Feb. 3, 2017 describing how a resonator can be designed as a pad, from a NPL book obtained via a google search.*
(Continued)

*Primary Examiner* — Anne M Antonucci
*Assistant Examiner* — Sanjeev Malhotra
(74) *Attorney, Agent, or Firm* — Knobbe, Martens, Olson & Bear, LLP

(57) ABSTRACT

Systems, methods, and apparatus are disclosed for parking and wireless power transfer and communication of messages in a parking and charging system. In one aspect, an apparatus for parking a vehicle for receiving charging in a parking and charging system is provided. The apparatus includes an antenna configured to wirelessly receive information identifying a location of one or more charging stations. The apparatus further includes a user interface configured to display information identifying at least one of the one or more charging stations. The apparatus further includes a controller configured to cause a communication link to be established between the vehicle with and at least one identified charging station.

42 Claims, 12 Drawing Sheets

(52) U.S. Cl.
CPC ....... *B60L 11/1829* (2013.01); *B60L 11/1838*
(2013.01); *H02J 7/00* (2013.01); *Y02T*
*10/7005* (2013.01); *Y02T 10/7072* (2013.01);
*Y02T 90/121* (2013.01); *Y02T 90/122*
(2013.01); *Y02T 90/125* (2013.01); *Y02T*
*90/128* (2013.01); *Y02T 90/14* (2013.01); *Y02T*
*90/16* (2013.01); *Y02T 90/163* (2013.01)

(58) Field of Classification Search
CPC ... Y02T 90/169; Y02T 90/16; Y02T 10/7088;
Y02T 10/7044; Y02T 10/705; Y02T
10/7241; Y02T 10/7291; Y02T 90/127;
Y02T 90/162; Y02T 90/122; Y04S 30/14;
G07F 15/005; G07F 15/003; G07F
17/0014; B60L 11/1816; B60L 11/1824;
B60L 11/1846; B60L 11/1825; B60L
11/1861; B60L 2210/40; B60L 2240/622;
B60L 2250/16; B60L 11/182; B60L
11/184; B60L 11/1848; B60L 11/185;
B60L 2200/26; B60L 2230/40; B60L
2240/70; B60L 2240/72; B60L 2240/80;
B60L 2250/10; B60L 2260/52; B60L
2260/54; B60L 2260/58; B60L 3/0069
USPC ................ 701/22, 36, 439, 532; 705/5, 412;
700/236, 291; 348/148; 340/5.61, 540,
340/5.65; 320/108, 109; 307/9.1, 104;
194/904; 726/9; 1/1
See application file for complete search history.

(56) References Cited

U.S. PATENT DOCUMENTS

| | | | |
|---|---|---|---|
| 2009/0082957 A1* | 3/2009 | Agassi | B60L 3/12 701/532 |
| 2009/0224724 A1* | 9/2009 | Ma | B60L 11/14 320/109 |
| 2010/0013434 A1* | 1/2010 | Taylor-Haw | B60L 11/1818 320/109 |
| 2010/0194529 A1* | 8/2010 | Yamamoto | B60L 11/1824 340/5.65 |
| 2010/0225475 A1* | 9/2010 | Karch | B60L 11/1824 340/540 |
| 2011/0093314 A1 | 4/2011 | Redmann et al. | |
| 2011/0148574 A1* | 6/2011 | Simon | B60R 25/24 340/5.61 |
| 2011/0199049 A1* | 8/2011 | Nagy | B60L 11/1816 320/109 |
| 2011/0202234 A1* | 8/2011 | Bradley | B60K 6/48 701/36 |
| 2011/0224852 A1 | 9/2011 | Profitt-Brown et al. | |
| 2011/0254503 A1* | 10/2011 | Widmer | B60L 11/182 320/108 |
| 2012/0033810 A1* | 2/2012 | Devadas | G06F 21/31 380/46 |
| 2012/0083932 A1* | 4/2012 | Ramaswamy | H02J 3/06 700/291 |
| 2012/0109519 A1* | 5/2012 | Uyeki | B60L 7/14 701/439 |
| 2012/0112531 A1* | 5/2012 | Kesler | B60L 11/182 307/9.1 |
| 2012/0123670 A1 | 5/2012 | Uyeki et al. | |
| 2012/0143410 A1* | 6/2012 | Gallagher | B60L 11/1861 701/22 |
| 2012/0187773 A1* | 7/2012 | Wechlin | B60L 11/182 307/104 |
| 2012/0191242 A1* | 7/2012 | Outwater | G06Q 30/06 700/236 |
| 2012/0206098 A1* | 8/2012 | Kim | B60L 11/182 320/108 |
| 2012/0233077 A1 | 9/2012 | Tate, Jr. et al. | |
| 2012/0236149 A1* | 9/2012 | Nagy | E04H 6/426 348/148 |
| 2012/0306446 A1* | 12/2012 | Suganuma | B60L 11/1824 320/109 |
| 2012/0319651 A1 | 12/2012 | Outwater et al. | |
| 2013/0033227 A1* | 2/2013 | Gibbons, Jr. | B60L 11/1829 320/108 |
| 2013/0038272 A1 | 2/2013 | Sagata | |
| 2013/0038284 A1* | 2/2013 | LaFrance | B60L 11/1838 320/109 |
| 2013/0041531 A1* | 2/2013 | LaFrance | B60L 11/1846 701/22 |
| 2013/0041850 A1* | 2/2013 | LaFrance | B60L 11/1838 705/412 |
| 2013/0110296 A1 | 5/2013 | Khoo et al. | |
| 2013/0175985 A1* | 7/2013 | Percich | H02J 7/00 320/108 |
| 2013/0339072 A1* | 12/2013 | Touge | G06Q 10/00 705/5 |
| 2014/0035526 A1* | 2/2014 | Tripathi | B60L 11/1838 320/109 |
| 2015/0042168 A1* | 2/2015 | Widmer | B60L 11/1829 307/104 |
| 2017/0098953 A1* | 4/2017 | Winkler | H02J 7/025 |
| 2017/0259673 A1* | 9/2017 | Rutyna | B60L 11/182 |

FOREIGN PATENT DOCUMENTS

EP 2199142 A1 6/2010
WO WO-2011109460 A3 12/2011

OTHER PUBLICATIONS

International Search Report and Written Opinion—PCT/US2013/049144—ISA/EPO—dated Nov. 27, 2013.

* cited by examiner

SYSTEMS, METHODS, AND APPARATUS RELATED TO ELECTRIC VEHICLE PARKING AND WIRELESS CHARGING

CROSS REFERENCE TO RELATED APPLICATIONS

This application claims priority under 35 U.S.C. § 119(e) to U.S. Provisional Patent Application No. 61/667,924 entitled "SYSTEMS, METHODS, AND APPARATUS RELATED TO ELECTRIC VEHICLE PARKING AND WIRELESS CHARGING" filed on Jul. 3, 2012, which is hereby incorporated by reference in its entirety.

FIELD

The present disclosure relates generally to wireless power transfer, and more specifically to devices, systems, and methods related to wireless power transfer to remote systems such as vehicles in a parking facility including batteries and communications there between.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are needed. A vehicle on its own may pair to every pad it is capable to when it is on its way to find a charging station for wireless power charging. In a parking facility with a plurality of charging stations available, a capable vehicle need navigate within the parking facility to find a proper parking space and establish communication with the corresponding charging station for receiving charging from the charging station therein.

SUMMARY

Various implementations of systems, methods and devices within the scope of the appended claims each have several aspects, no single one of which is solely responsible for the desirable attributes described herein. Without limiting the scope of the appended claims, some prominent features are described herein.

One aspect of the subject matter described in the disclosure provides an apparatus for parking a vehicle for receiving charging in a parking and charging system. The apparatus includes an antenna configured to wirelessly receive information identifying a location of one or more charging stations. The apparatus further includes a user interface configured to display information identifying at least one of the one or more charging stations. The apparatus further includes a controller configured to cause a communication link to be established between the vehicle and at least one identified charging station.

Another aspect of the subject matter described in the disclosure provides a method of parking a vehicle for receiving charging in a parking and charging system. The method includes receiving wireless information identifying a location of one or more charging stations. The method further includes displaying information identifying at least one of the one or more charging stations. The method further includes establishing a communication link between the vehicle and at least one identified charging station.

Another aspect of the subject matter described in the disclosure provides a wireless parking and charging apparatus for receiving charging in a parking and charging system. The apparatus includes means for receiving information identifying a location of one or more charging stations. The apparatus further includes means for displaying information identifying at least one of the one or more charging stations. The apparatus further includes means for causing a communication link to be established between the vehicle and at least one identified charging station.

Another aspect of the subject matter described in the disclosure provides a non-transient computer readable media having instructions stored thereon that cause a wireless power transferring apparatus to perform a method of receiving charging in a parking and charging system. The method includes receiving wireless information identifying a location of one or more charging stations. The method further includes displaying information identifying at least one of the one or more charging stations. The method further includes establishing a communication link between the vehicle and at least one identified charging station.

Details of one or more implementations of the subject matter described in this specification are set forth in the accompanying drawings and the description below. Other features, aspects, and advantages become apparent from the description, the drawings, and the claims. Note that the relative dimensions of the following figures may not be drawn to scale.

Figure 1:
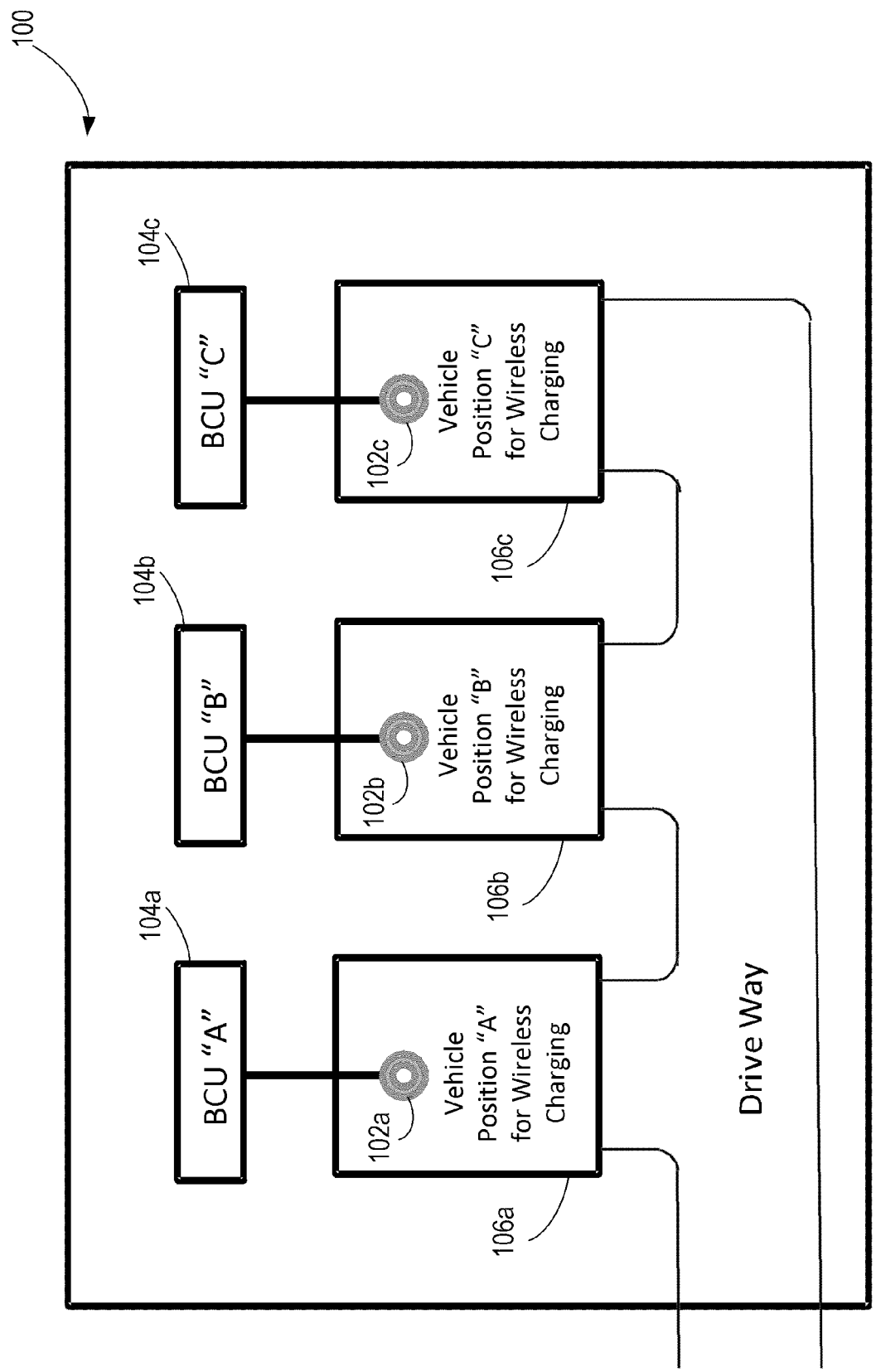
FIG. 1 is a functional block diagram of an exemplary multi-vehicle and multi-parking lot system, in accordance with various implementations.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a functional block diagram of an exemplary multi-vehicle and multi-parking parking and charging system 100, in accordance with various implementations. In one embodiment, the parking and charging system 100 may have a plurality of parking spaces and a plurality of charging station so that it can simultaneously charge a plurality of vehicles. A vehicle in the parking and charging system 100 may simultaneously identify and/or establish communications with more than one charging stations. Without a user's direction, the vehicle may select and establish communications with a charging station that is not expected by the user. For example, the user may park over a desired charging station, but the vehicle may establish communications with another charging station, for example, one that is next to or otherwise close to the desired charging station. As such, it may be important to disambiguate the different charging stations such that the vehicle establishes communication with the charging station that the user has identified for use.

When a vehicle is driven into the parking and charging system 100, the driver of the vehicle is able to identify one or more charging stations from a plurality of available charging stations and request charging from an identified charging station. In one embodiment, the driver of a vehicle in the parking and charging system 100 may visually identify an available parking space having an available charging station located in it. For example, as is further described below, a sign of the identified charging station may be provided on the parking space so as to allow a vehicle to identify a correct charging station. In addition, the driver of the vehicle in the parking and charging system 100 may discover and identify an available charging station through a wireless communication interface. After the driver of the vehicle visually identifies a plurality of available charging stations and wirelessly discovers a plurality of available charging stations, the driver may match a visually identified charging station with a wirelessly identified charging station. Furthermore, the driver of the vehicle in the parking and charging system 100 may select one of the identified charging stations to charge the vehicle. A user's selection of a charging station may be stored as a "default" charging station for simplifying a charging process for subsequent visits, which would especially be useful in situations where the user has a pre-designated parking space in a parking and charging facility.

In one embodiment, there are a plurality of parking spaces each of them being marked with a space number in the parking and charging system 100. A charging station is located in each parking space. As shown in FIG. 1, a parking space 106a hosts a charging station 102a and is marked with a space number 104a that is "A", a parking space 106b hosts a charging station 102b and is marked with a space number 104b that is "B", and a parking space 106c hosts a charging station 102c and is marked with a space number 104c that is "C." The space numbers help a user identify available charging stations in the parking and charging system 100.

Figure 2:
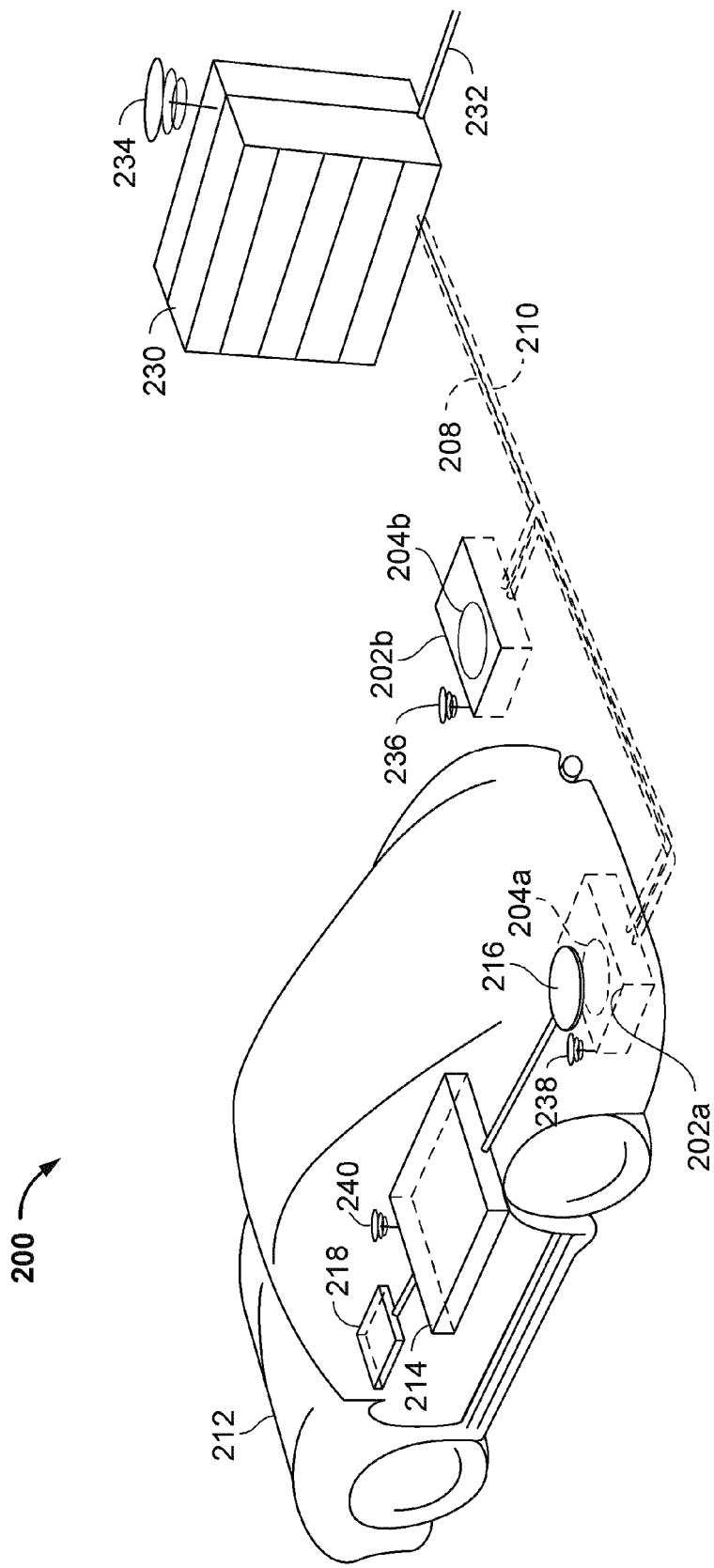
FIG. 2 illustrates a diagram of an exemplary wireless power transfer system for charging an electric vehicle, in accordance with an exemplary implementation.

FIG. 2 is a diagram of an exemplary wireless power transfer system 200 for charging an electric vehicle 212. The wireless power transfer system 200 enables charging of an electric vehicle 212 while the electric vehicle 212 is parked near a base wireless charging system 202a. Spaces for two electric vehicles are illustrated in a parking area to be parked over corresponding base wireless charging systems 202a and 202b. In some embodiments, a local distribution center 230 may be connected to a power backbone 232 and configured to provide an alternating current (AC) or a direct current (DC) supply through a power link 210 to the base wireless charging system 202a. The base wireless charging system 202a also includes a base system induction coil 204a for wirelessly transferring or receiving power and an antenna 236. An electric vehicle 212 may include a battery unit 218, an electric vehicle induction coil 216, an electric vehicle wireless charging system 214, and an antenna 240. The electric vehicle induction coil 216 may interact with the base system induction coil 204a for example, via a region of the electromagnetic field generated by the base system induction coil 204a.

Figure 3:
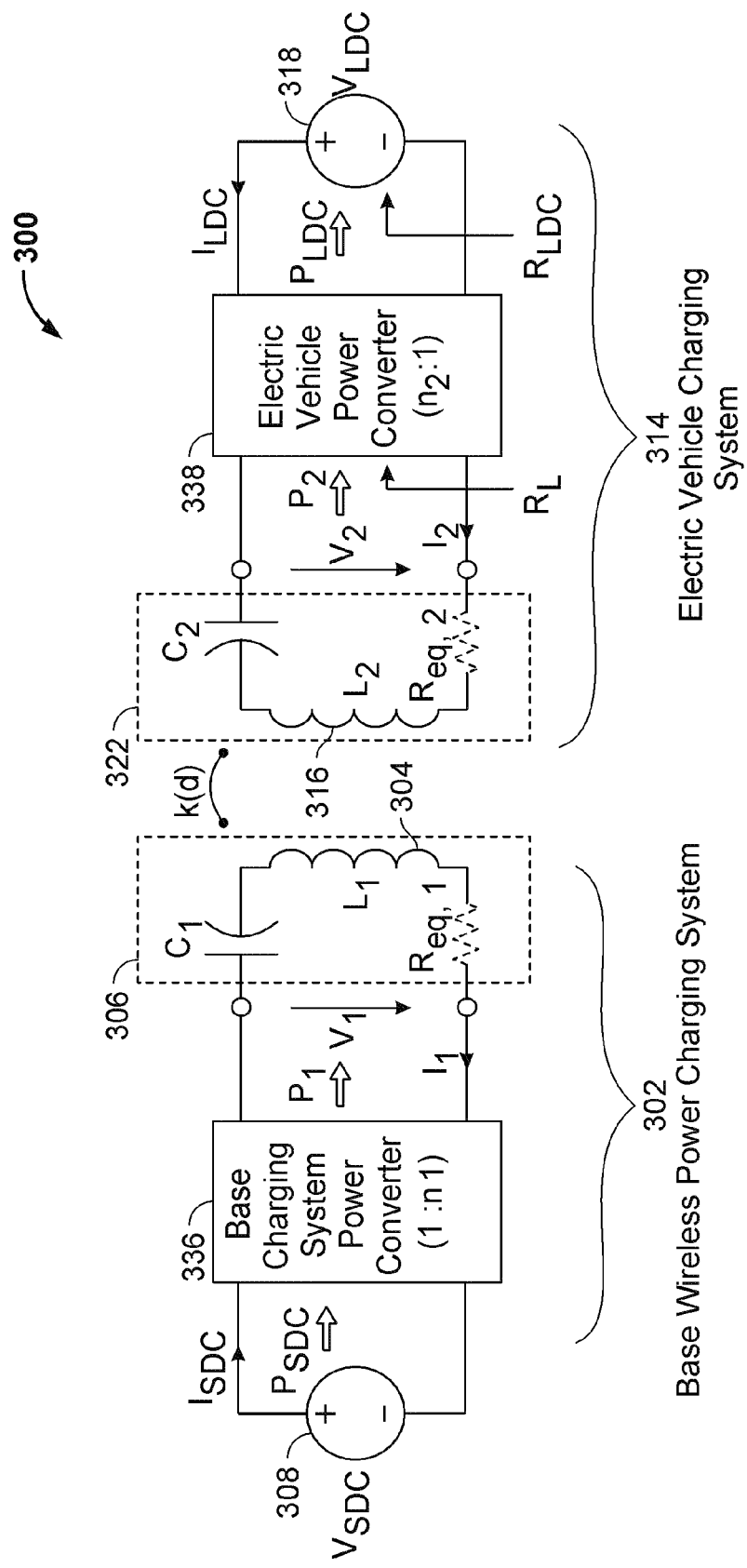
FIG. 3 illustrates a schematic diagram of core components of an exemplary wireless power transfer system.

FIG. 3 is a schematic diagram of exemplary components of the wireless power transfer system 200 of FIG. 2. As shown in FIG. 3, the wireless power transfer system 300 may include a base system transmit circuit 306 including a base system induction coil 304 having an inductance $L_1$. The wireless power transfer system 300 further includes an electric vehicle receive circuit 322 including an electric vehicle induction coil 316 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 316 and the base system induction coil 304. Using resonant structures for coupling energy may be referred to "magnetic coupled resonance," "electromagnetic coupled resonance," and/or "resonant induction." The operation of the wireless power transfer system 300 may be described based on power transfer from a base wireless power charging system 302 to an electric vehicle 212, but is not limited thereto. For example, as discussed above, the electric vehicle 212 may transfer power to the base wireless charging system 202a.

Figure 4:
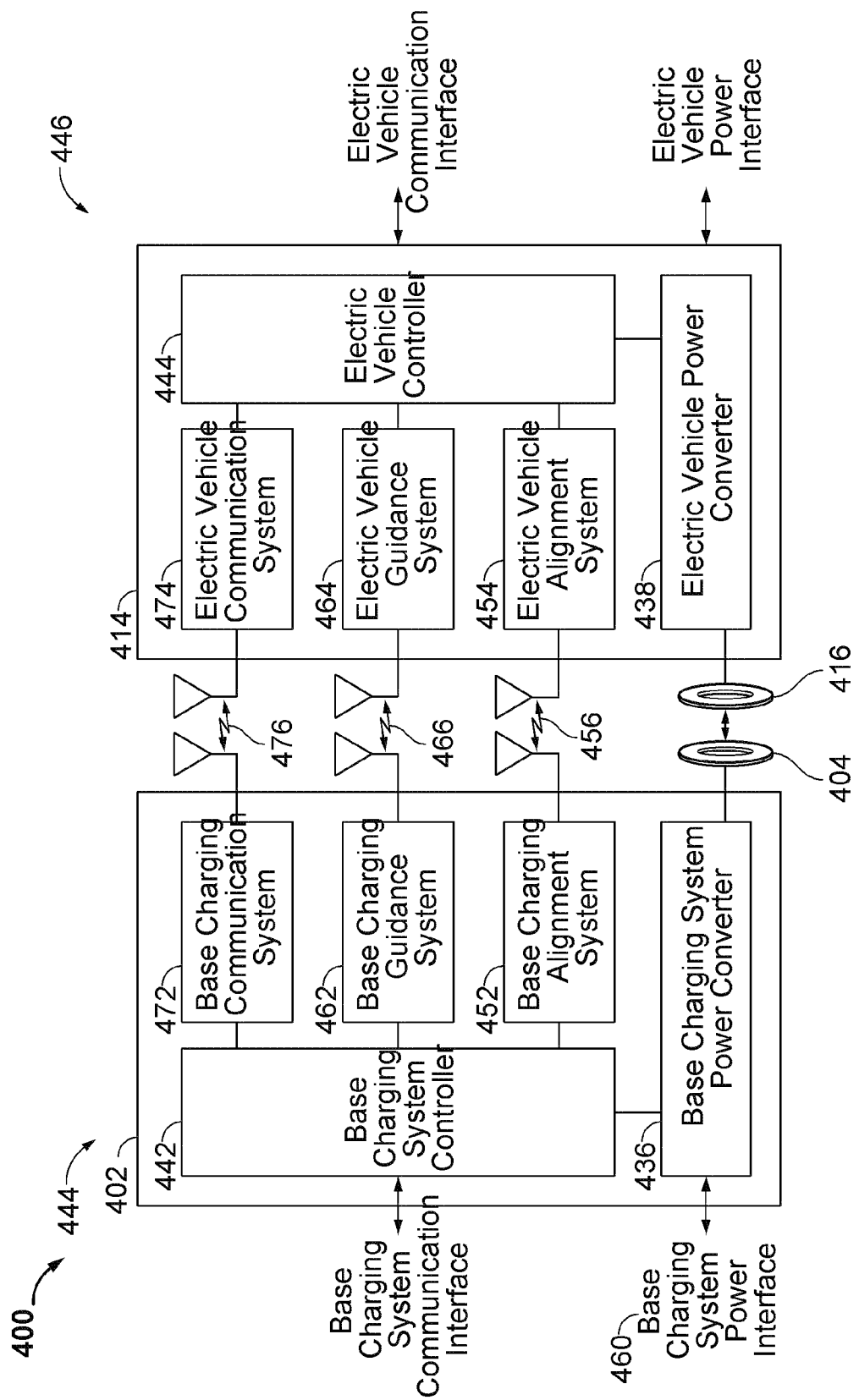
FIG. 4 illustrates another functional block diagram showing core and ancillary components of an exemplary wireless power transfer system.

FIG. 4 is another functional block diagram showing exemplary core and ancillary components of the wireless power transfer system 400 of FIG. 2. The wireless power transfer system 400 illustrates a communication link 476, a guidance link 466, and alignment systems 452, 454 for the base system induction coil 404 and electric vehicle induction coil 416. As described above with reference to FIG. 3, and assuming energy flow towards the electric vehicle 212, in FIG. 4 a base charging system power interface 460 may be configured to provide power to a charging system power converter 436 from a power source, such as an AC or DC power supply 226. The base charging system power converter 436 may receive AC or DC power from the base charging system power interface 460 to excite the base system induction coil 404 at or near its resonant frequency. The electric vehicle induction coil 416, when in the near field coupling-mode region, may receive energy from the near field coupling mode region to oscillate at or near the resonant frequency. The electric vehicle power converter 438 converts the oscillating signal from the electric vehicle induction coil 416 to a power signal suitable for charging a battery via the electric vehicle power interface.

Figure 5:
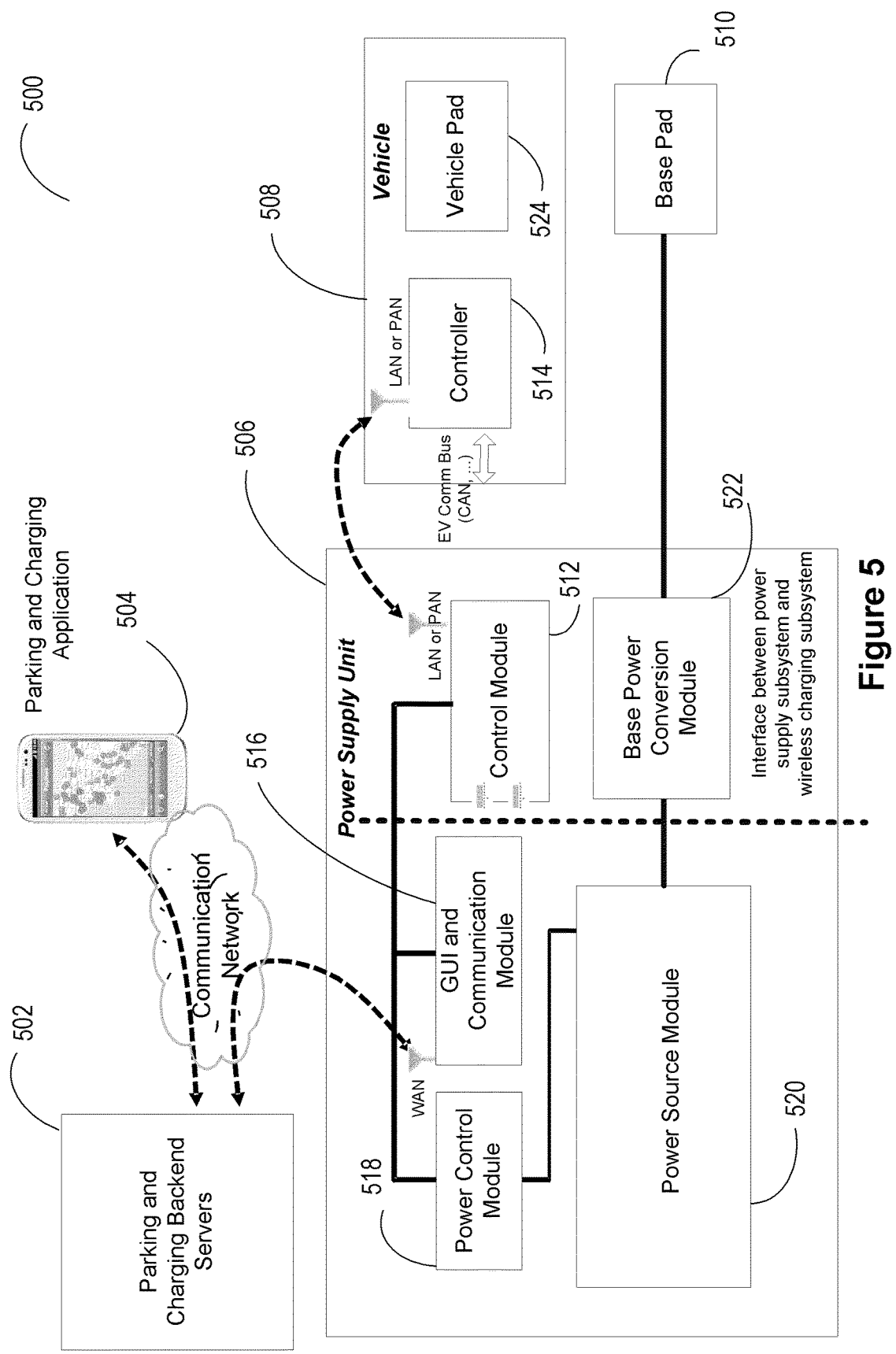
FIG. 5 is a functional block diagram of the components for an exemplary parking and charging system, in accordance with various implementations.

FIG. 5 is a functional block diagram of exemplary components that may be used in the parking and charging system 100 of FIG. 1, in accordance with various implementations. A parking and charging system component set 500 shown in FIG. 5 comprises a group of parking and charging backend servers 502, a parking and charging application 504, a power supply unit 506 that may be a part of the charging stations 102a, 102b and 102c shown in FIG. 1, and a part of the charging stations 202a and 202b in FIG. 2, a vehicle 508 and a base pad 510 that also is a part of the charging stations 102a, 102b and 102c shown in FIG. 1, and a part of the charging stations 202a and 202b in FIG. 2. In one embodiment, the vehicle 508 communicates with the charging station 102a in FIG. 1, but is not limited thereto, for a charging service. The charging station 102a comprises the power supply unit 506 and the base pad 510. In another embodiment, a control module 512 of the power supply unit 506 and a controller 514 of the vehicle 508 both have at least one communication module embedded. The communication between the vehicle 508 and the charging station 102a may be conducted through a wireless link, which may be a Bluetooth or Wi-Fi link but is not limited thereto, between the control module 512 and the controller 514. After the charging station 102a receives a request from the vehicle 508, it may check if it need communicate with the group of parking and charging backend servers 502 or the parking and charging application 504 or not. If the charging station 102a decides to communicate with the group of parking and charging backend servers 502 or the parking and charging application 504, the control module 512 may contact a GUI and communication module 516 for setting up a communication link. The GUI and communication module 516 has a communication module embedded that may be wired or wireless. The GUI and communication module 516 is able to setup communication links between the charging station 102a and the group of parking and charging backend servers 502 or the parking and charging application 504 through a communication network.

In one embodiment, a short range wireless device (e.g., a Bluetooth device) is located on the power supply unit 506 of a base charging unit (e.g., any base charging unit 104 of FIG. 1) and the base charging unit is located at a charging slot (e.g., any corresponding parking space 106 of FIG. 1). An identification of the short range wireless device may be configured as "PS-X," where X is a corresponding space number of the charging slot (e.g., the number "A," "B" and "C" for the parking space 106a-106c of FIG. 1).

In another embodiment, the charging station 102a may start charging after it accepts a request from the vehicle 508. In this embodiment, the control module 512 may communicate with a power control module 518 and a base power conversion module 522 of the power supply unit 506 for a charging service. The power control module 518 controls a power source module 520 of the power supply unit 506 for supplying power to the base power conversion module 522. The base power conversion module 522 converses the power supplied from the power source module 520 to a certain type of power satisfying the requirement of the base pad 510. After receiving the power in a required format, the base pad 510 may start charge the vehicle 508.

Figure 6:
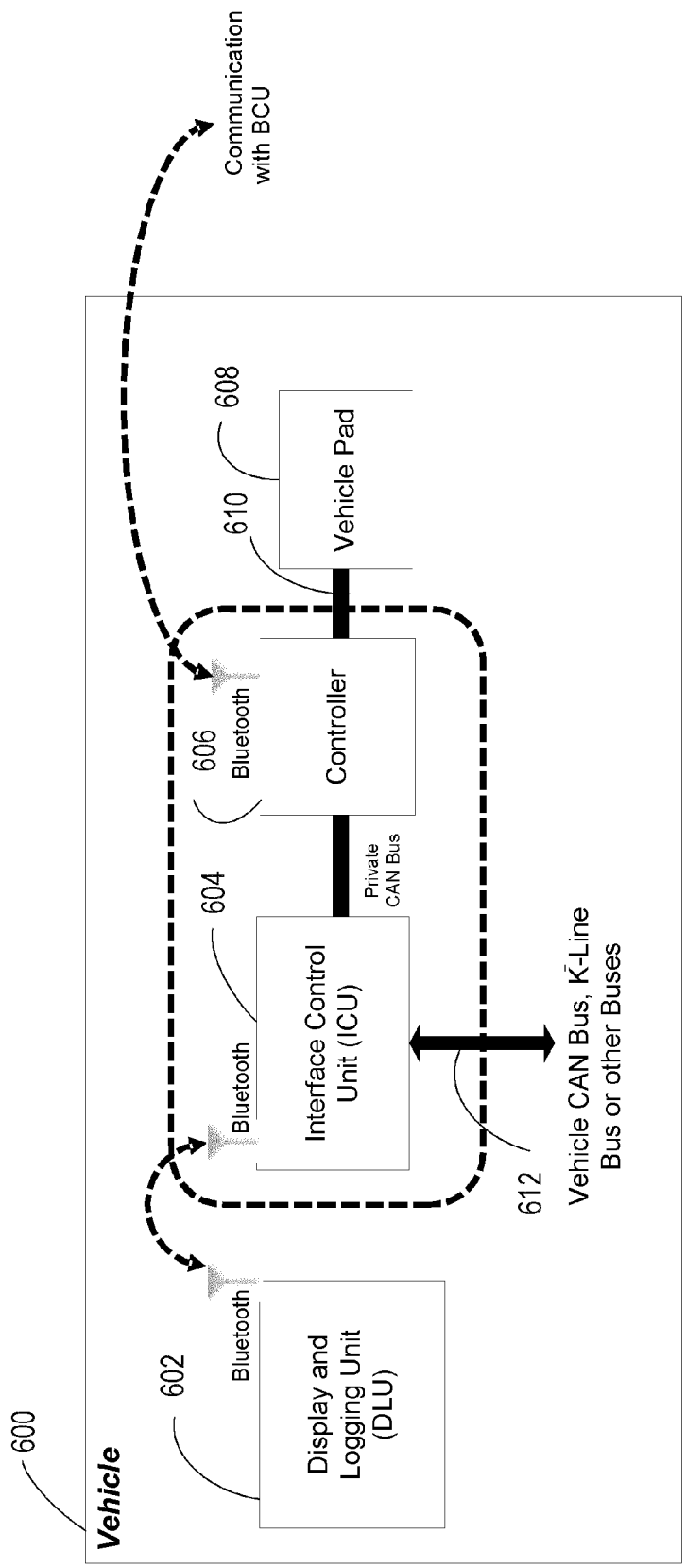
FIG. 6 is a functional block diagram of an exemplary chargeable vehicle, in accordance with various implementations.

FIG. 6 is a functional block diagram of an exemplary chargeable vehicle 600, in accordance with various implementations. A vehicle 600 shown in FIG. 6 may be the chargeable vehicle 200 shown in FIG. 2. The vehicle 600 may also be the chargeable vehicle 508 shown in FIG. 5. The vehicle 600 comprises a display and logging unit (DLU) 602, an interface control unit (ICU) 604, a controller 606, a vehicle pad 608 and a vehicle bus 610. In one embodiment, the vehicle 600 communicates with at least a base charging unit (BCU) or a charging station. An exemplary charging station or base charging unit is the charging station 102a in FIG. 1, the charging station 202a in FIG. 2, the base wireless power charging system 302 in FIG. 3, or the wireless charging system 402 in FIG. 4. Though the communication link between a charging station and the vehicle 600 in FIG. 5 is shown to be an exemplary Bluetooth link, it may be any possible personal area network (PAN) link, such as a ZigBee link, a local area network (LAN) link such as a Wi-Fi link, or a wide area network (WAN) link, such a 3G or 4G mobile communication link. The vehicle 600 may simultaneously maintain the communication with one or more charging stations.

The controller 606 is connected through the vehicle bus 610 to the vehicle pad 608. The controller 606 controls any wireless charging service received from the charging station 102a but is not limited thereto. In another embodiment, the vehicle bus 610 between the controller 606 and the vehicle pad 608 is a private CAN bus. In addition, the controller 606 shares the vehicle bus 610 with the interface control unit 604. Therefore, a signal and data exchange between the controller 606 and the interface control unit 604 may be done through the vehicle bus 610.

The interface and control unit 604 has at least one communication module embedded for communicating with a display and logging unit 602. In one embodiment, though the communication link between the interface control unit 604 and the display and logging unit 602 is shown to be a Bluetooth link in FIG. 6, it may be any link of personal area network, wide area network, metropolitan area network or even a wired communication network in various implementations.

The display and logging unit 602 displays related information received from one or more charging stations, the interface control unit 604, the controller 606, the antenna 614 to a user. The display and logging unit 602 may comprise a user interface. The display and logging unit 602 may send a response it receives from the user back to the interface control unit 604, the controller 606, the charging station 102a or any other related component. The display and logging unit 602 may log any related communication between the user and any related component in the vehicle 600 and the charging station 102a. In one embodiment, besides the display and logging unit 602 and the controller 606, the interface control unit 604 may communicate with any other related entity that is not shown here inside the vehicle 600. In another embodiment, this kind of communication may be done through a vehicle bus 612, which may a vehicle CAN Bus, K-Link bus or any other applicable bus. In some embodiments, the controller 606 comprises the antenna 614.

Figure 7:
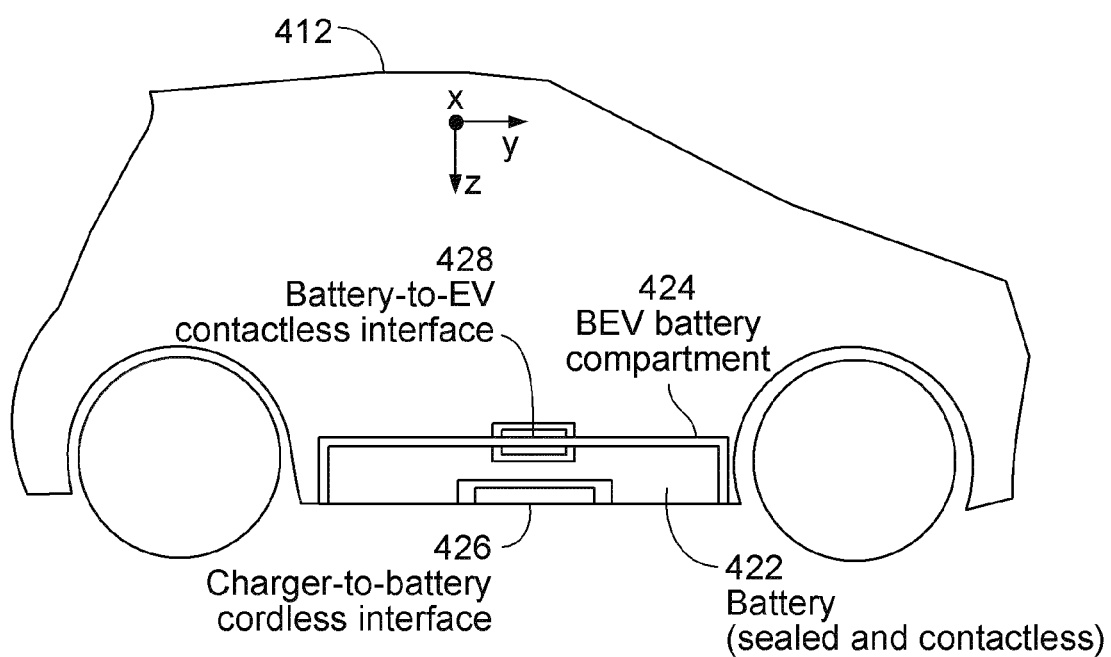
FIG. 7 illustrates a functional block diagram showing an exemplary replaceable contactless battery disposed in an electric vehicle, in accordance with variance implementations.

The parking and charging system 100 and the wireless power transfer system 200 described may be used with a variety of electric vehicles 212 including rechargeable or replaceable batteries. FIG. 7 is a functional block diagram showing a replaceable contactless battery disposed in an electric vehicle 712, in accordance with an exemplary embodiment of the invention. In this embodiment, the low battery position may be useful for an electric vehicle battery unit that integrates a wireless power interface (e.g., a charger-to-battery cordless interface 726) and that may receive power from a charger (not shown) embedded in the ground. In FIG. 7, the electric vehicle battery unit may be a rechargeable battery unit, and may be accommodated in a battery compartment 724. The electric vehicle battery unit also provides a wireless power interface 726, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 722 may also include a battery-to-EV cordless interface 722, and a charger-to-battery cordless interface 726 that provides contactless power and communication between the electric vehicle 712 and a base wireless charging system 202a as shown in FIG. 2.

Figure 8:
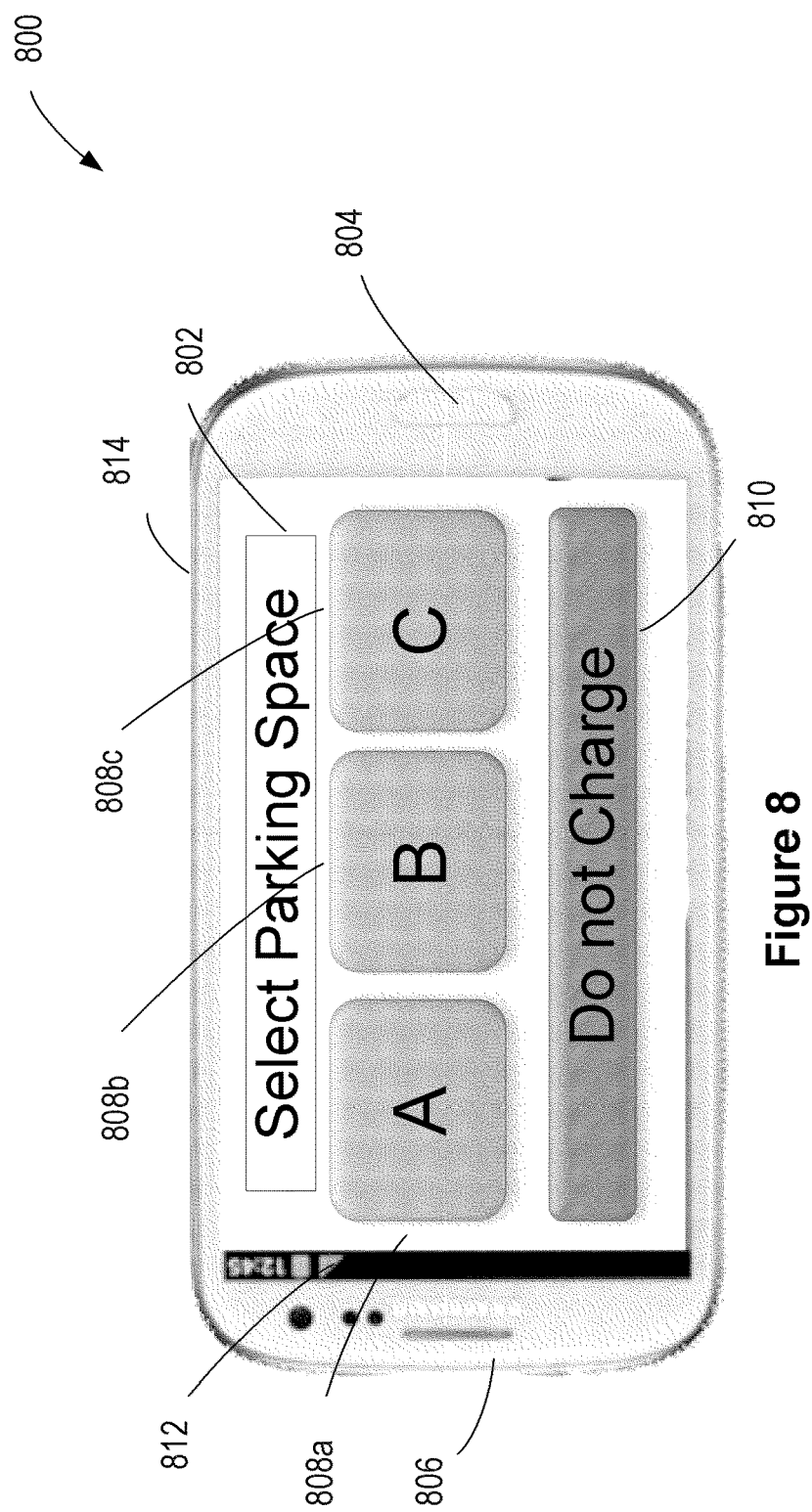
FIG. 8 is a functional block diagram of an exemplary user interface of a display and logging unit, in accordance with various implementations.

FIG. 8 shows a functional block diagram of an exemplary display and logging unit 800. In one embodiment, the display and logging unit 800 may be included in the vehicle 600. In another embodiment, the display and logging unit 800 may be located in a mobile device which is separated from the vehicle 600. In one embodiment, the display and logging unit 800 may provide a user interface (UI) 814, a microphone 804, a speaker 806 and a status indicator 812. The user interface 814 may comprise a plurality of buttons, such as buttons 808a, 808b and 808c, for indicating available charging stations discovered by the vehicle 600. If a user decides to select one of the identified charging stations displayed on the interface, the user may touch any corresponding button shown in the user interface 814.

In another embodiment, the user interface 814 comprises a "Do not Charge" button, which is shown as the button 810. If the user decides not to charge the vehicle 600, the button 810 may be selected to confirm the decision. The status of a communication link between the display and logging unit 800 and the vehicle 600 may be indicated through the status bar 812. In one embodiment, the user may identify the target parking location using the microphone 804. In one embodiment, if a user selects the button 810, the display and logging unit 800 does not proceed with pairing with any of the charging stations. In another embodiment, when the user interface 814 on the display and logging unit 800 sends a user's selection back to a vehicle charging unit of the vehicle 600, the vehicle charging unit establishes a communication link between a charging pad with at least one selected base charging unit. For example, the vehicle charging unit pairs a charging pad with at least one selected base charging unit.

In one embodiment, a user's selection of a charging station via the user interface 814 is stored as a "default" charging station. This may simplify a charging process for subsequent visits. This may also be useful in situations where the user has a pre-designated parking space or a pre-designated charging station in a parking and charging facility. After a user's selection of a charging station is set as a "default" base charging unit, the user interface 814 may display one or more alternate options during a short time window to the user and give the user an opportunity to select an alternate parking space and/or a an alternate charging station. Otherwise, the user interface 814 may automatically control a related vehicle charging unit to connect to the "default" charging station. In situations where a user ignores a status and/or available options displayed on the user interface 814 and the user uses a "default" connection to automatically connect with a "default" base charging unit, the display and logging unit 800 may maintain a timer and monitor a received alignment score from a vehicle charging unit of the user's vehicle. An alignment score is a measure of how close an electric vehicle's charge receive pad is above the base charging pad in a wireless electric vehicle station equipment (EVSE). If an alignment score stays out of a range (e.g., an alignment score is greater than 10) for a pre-designated period of time, the display and logging unit 800 may invoke a shutdown command to stop a charging process and/or disconnect a vehicle charging unit of a vehicle from a base charging unit.

In another embodiment, most base charging units are always in a discovery mode so that they are ready to be discovered. Similarly, most vehicle charging units may always be searching for a base charging unit in a parking and charging facility. A base charging unit may continuously be in a discovery mode until it is connected with a vehicle charging unit of a vehicle. A vehicle charging unit of a vehicle may be searching for a base charging unit until its power is turned off by the vehicle.

In yet another embodiment, most of vehicle charging units of various vehicles use a shared identification and/or a shared pass code for receiving services from available base charging units in a parking and charging facility. On the other hand, a charging station identification sequence may include a parking and charging system identification sequence or a charging station identification number. A charging station identification number may be any number of alphabet sequences.

In another embodiment, a method of identifying a parking slot and/or a charging station comprises identifying at least one charging slot or station via a user interface of a handheld device, for example, a smart phone. This method may further comprise receiving information identifying a charging slot number at an electric vehicle station equipment (EVSE). Information identifying a location of a charging station may comprise a space number identifying a parking space or a parking slot where the charging station is located. The method of identifying the parking slot and/or the parking station may further comprise receiving information identifying availability of a charging station. The availability of the charging station may be indicated through broadcasting a charging station identification sequence of the charging station in a discovery mode of a radio device (e.g., a Bluetooth radio device). When a vehicle with a vehicle charging unit searches for a base charging unit, it may find a charging space number (e.g., the number "A," "B" and "C" for the parking space 106a-106c of FIG. 1). The method of identifying a charging slot or station may further comprise receiving a charge.

Figure 9:
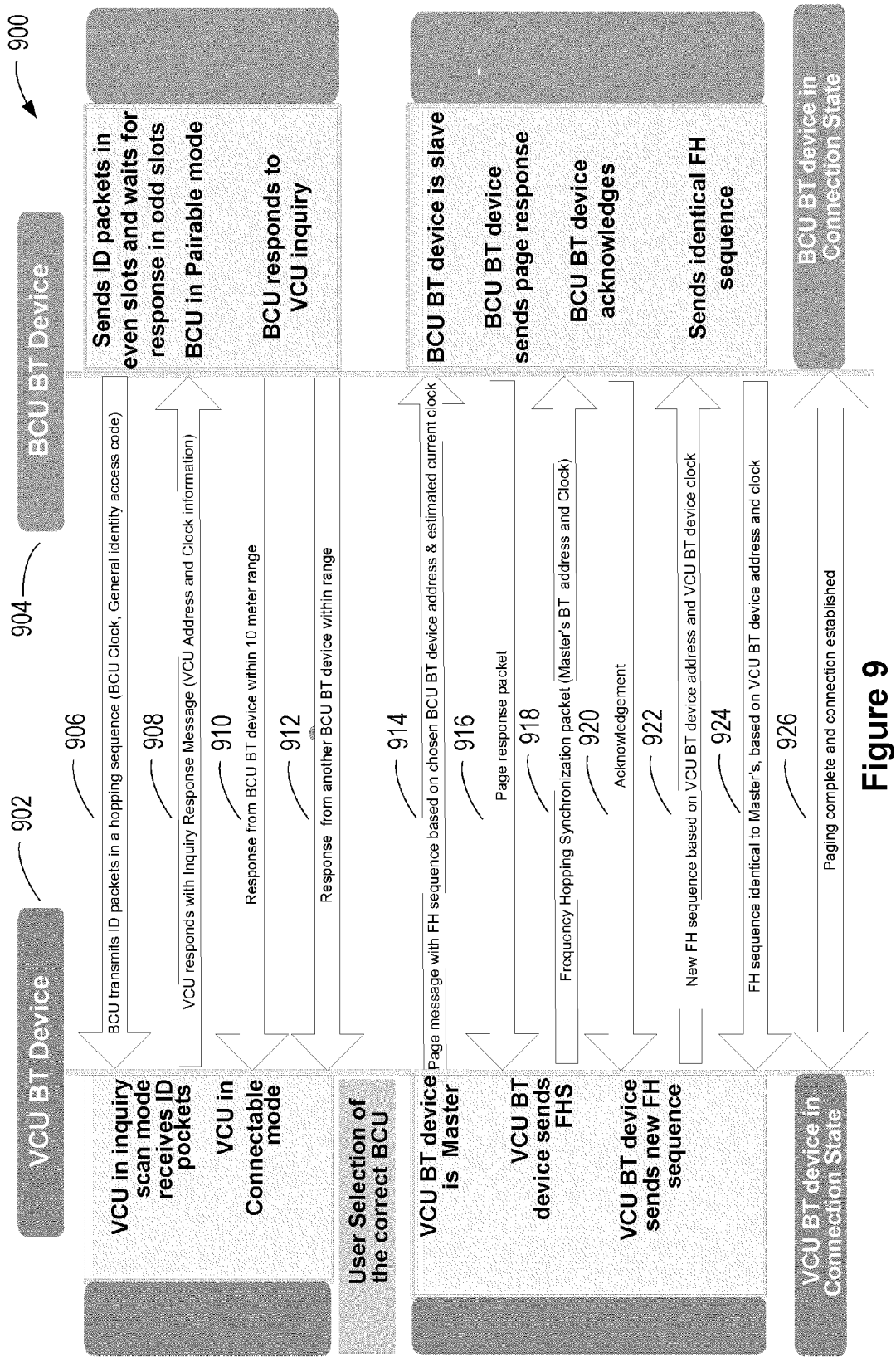
FIG. 9 is a message flow diagram between an exemplary vehicle and an exemplary charging station, in accordance with various implementations.

FIG. 9 is a message flow diagram between an exemplary vehicle and an exemplary charging station. FIG. 9 illustrates a communication procedure for establishing a connection between a vehicle charging unit personal area network device 902 and a base charging unit personal area network device 904. The vehicle charging unit personal area network device 902 may be the communication module of the controller 514 shown in FIG. 5 and the communication module of the controller 606 shown in FIG. 6. The base charging unit personal area network device 904 may be the communication module of the control module 512 shown in FIG. 5. The process starts from the block 906 shown in FIG. 9. In one embodiment, the base charging unit personal area network device 904 transmits identification packets in a hopping sequence that comprises information identifying a station clock time and an identity access code. Since the vehicle charging unit personal area network device 902 is in an inquiry scan mode, it may discover the identification packets sent by the base charging unit personal area network device 904 and respond with an inquiry response message that comprises its vehicle charging unit address and clock information (block 908). Next, in the blocks 910 and 912, if each base charging unit personal area network device 904 is in a pairable mode and in an operating range, it may respond with a reply message to the vehicle charging unit personal area network device 902. In one embodiment, at the block 908, after the vehicle charging unit personal area network device 902 receives each response to the inquiry, it may relay information identifying the charging station to the user interface 814 of the display and logging unit 800 in FIG. 8. From the user interface 814, a user may select one of the identified charging stations.

Continuing to block 914, after the user makes a decision, the vehicle charging unit personal area network device 902 may become a master terminal and then transmit a message with the frame hopping sequence based on a identified charging station personal area network device address and an estimated current clock. Next, at block 916, the identified base charging unit personal area network device 904 is in a slave mode and sends a response to the vehicle charging unit personal area network device 902. The vehicle charging unit personal area network device 902 may send a frequency hopping synchronization packet, which comprises the master's network address and clock, to the base charging unit personal area network device 904 (block 918). Following that, the base charging unit personal area network device 904 may respond with an acknowledgement shown in the block 920. The vehicle charging unit personal area network device 902 may further send a new frequency hopping sequence based on its device address and clock to the base charging unit personal area network device 904 in the block 922 of FIG. 9. Next, at the block 924, the base charging unit personal area network device 904 may send back the same frequency hopping sequence to the vehicle charging unit personal area network device 902.

Figure 10:
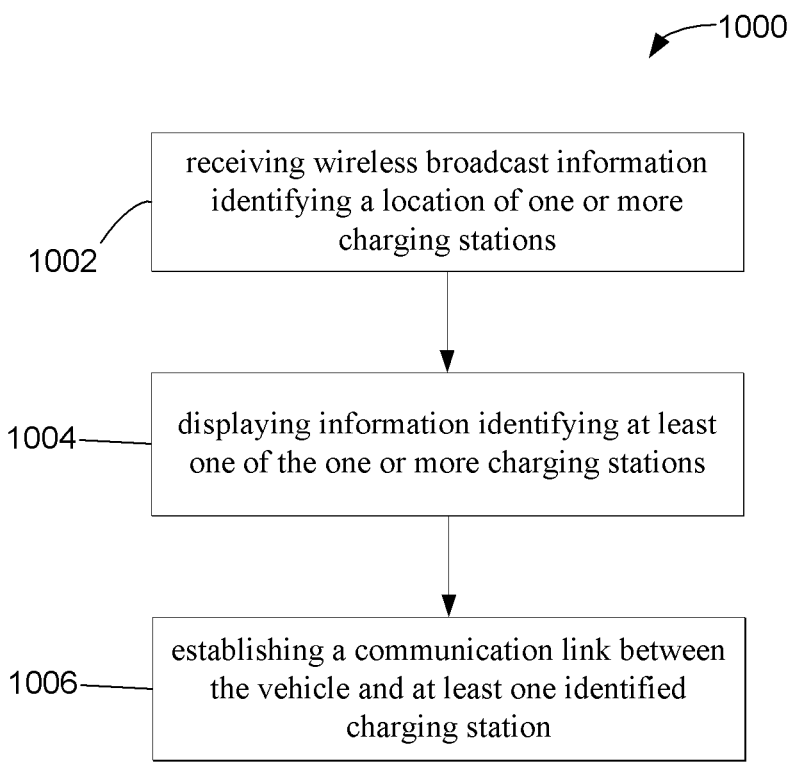
FIG. 10 illustrates a flowchart of an exemplary method of receiving wireless power from a charging station.

In one embodiment, when the vehicle 212 in FIG. 2 or the vehicle 508 of FIG. 5 enters the parking and charging system 100, it may search for available charging stations and in this example, find the charging stations 102a, 102b or 102c. FIG. 10 is a flowchart illustrating an exemplary method of receiving wireless power from a charging station 102a. Starting at block 1002 in FIG. 10, the vehicle 508 receives wireless broadcast information identifying a location of one or more charging stations (e.g., any charging station 102 of FIG. 1). For example, the information identifying the location of the charging station 102a may be broadcasted via a wireless communication module (e.g., the GUI and communication module 516 of FIG. 5) located on the charging station 102a. After a step of block 1002, the vehicle 508 displays information identifying at least one of the one or more charging stations, for example, via the user interface 814 of FIG. 8. After the vehicle 508 displays the information identifying charging stations available to a user, the user may make a selection based at least part of the displayed information and/or the user's observation. Finally as shown at block 1006, a communication link may be established between the vehicle 508 and at least one identified charging station, for example, under a control of the controller 514 of FIG. 5.

The vehicle 508 may search for an available charging station using more than one supported wireless communication standards. The vehicle 508 may report that there is no available charging station to a user after searching for a predetermined period of time. After searching for a predetermined period of time and finding no available charging stations, the vehicle 508 may pause for a predetermined period of time and retry later. After the searching procedure indicated in the block 1002 is successfully finished, the vehicle 508 may be charged by the identified charging station.

In one embodiment, before receiving the power from an identified charging station, the vehicle 508 may adjust and pair its vehicle pad 524 to the base pad 510 of the power supply unit 506 of the identified charging station 102a, such as by adjusting the relative position of the vehicle pad 524 and communicating with the control module 512 of the power supply unit 506. The communication between the vehicle 508 and the identified charging station 102a may further comprise exchanging additional information for authentication, authorization or billing. In addition, the communication between the vehicle 508 and the identified charging station 102*a* may further comprise exchanging the information of necessary charging parameters.

A wrong selection may occur on the user interface 602 of the vehicle 600. For example, the parking space "B" may be incorrectly identified through the user interface 602 of the vehicle 600, while the user is parking on the space "A." In this case, the vehicle 600 may not be located in the selected parking space "B." The selected charging station located in the parking space "B" may launch a timer counting a grace period before charging. After the timer expires without the charging station detecting an electrical coupling with the vehicle, the charging station reverts back to the discovery mode. In another embodiment, during the timed grace period, the user may still be able to reselect the desired charging station in the parking space "A." In another embodiment, as long as a user reselects a different charging station, the previous selected one may be reset back into the discovery mode.

During the process of searching for an available charging station, the vehicle 508 may find at least one charging station with a predetermined charging station identification sequence. In one embodiment, the charging station identification sequence comprises a parking and charging system identification sequence and a charging station identification number. In one embodiment, the parking and charging system identification sequence identifies the parking and charging system in which the vehicle 508 is located. In one aspect, there is a correspondence between the identification sequence of each charging station and the space number that is affiliated with the parking space. One exemplary parking and charging system identification sequence is "QCHALOIPT-PS." In one embodiment, there are more than one charging stations in the parking and charging system 100 as shown in FIG. 1, and each charging station has a charging station identification number. In one embodiment, the charging station 102*a* located in the parking space 106*a* has a charging station identification number "A." For example, the charging station identification sequence for the charging station 102*a* may be "QCHALOIPT-PS-A." Similarly, one exemplary charging station identification sequence for the charging station 102*b* location in the parking space 106*b* may be "QCHALOIPT-PS-B" and one exemplary charging station identification sequence for the charging station 102*c* location in the parking space 106*c* is "QCHALOIPT-PS-C." In another embodiment, where there is only charging station available, this charging station identification number can be any number or alphabet sequence, such as a sequence of "ANY." In this case, if the charging stations 102*a* is the only one in the parking and charging system 100, it may be configured to use "ANY" as the charging station identification number. Then, the identification sequence of the charging station 102*a* becomes "QCHALOIPT-PS-ANY."

In another embodiment, all vehicles or vehicle charging units in the parking and charging system 100 may use the same base identifier. In one example, this shared vehicle charging unit identification sequence may comprise a parking and charging system identification sequence and a vehicle identification number or subsequence. For example, the parking and charging system 100 may have an identification sequence, "QCHALOIPT."

The vehicle may recognize the charging station identification sequences of the discovered charging stations share a common base suffix. In this example, these charging station identification sequences share the identification sequence of the parking and charging system 100, "QCHALOIPT." In this case, a vehicle may truncate the beginning portion of the discovered parking station identification sequences, and only display the portion of the identification sequences that are different to the user.

In one embodiment, a plurality of charging stations in a parking and charging system are in a discovery mode at least until they are connected with a vehicle. In a discovery mode, each charging station broadcasts its charging station identification sequence through its communication module. For example, the wireless communication module is the one included in the control module 512 shown in FIG. 5. The communication standards and protocol used by a communication module may be Bluetooth, ZigBee, Wi-Fi or any other applicable communication standards and protocol but is not limited thereto. In one embodiment, the vehicle 508 may keep searching for a charging station unless it finally finds and connects to an identified charging station or the power of its communication module is turned off. In another embodiment, the vehicle 508 has its own list of preferred charging stations and it only searches for the charging stations listed on its preferred list. In one embodiment, the vehicle 508 is preconfigured to only pair with a specific base charging unit, for example, "QCHALOIPT-PS-A."

Figure 11:
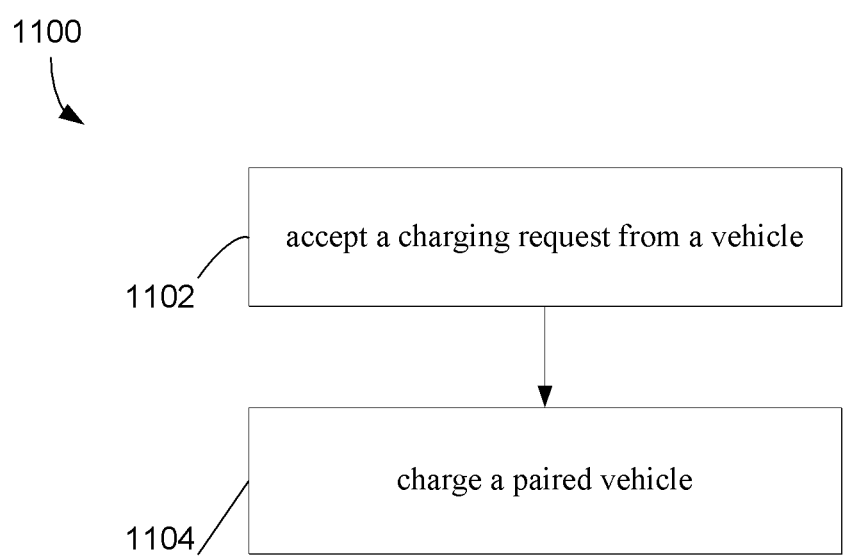
FIG. 11 illustrates a flowchart of an exemplary method of delivering wireless power to an electric vehicle.

In one embodiment, the charging stations 102*a*, 102*b* and 102*c* in a parking and charging system 100 are in a discovery mode and ready for accepting a charging request from a vehicle before they are connected to a vehicle. FIG. 11 illustrates a flowchart of an exemplary method of delivering wireless power to an electric vehicle from any one of the charging stations 102*a*, 102*b* and 102*c*. The method starts from the block 1102 in FIG. 11, wherein a charging station is in a discovery mode and the charging station is ready for accepting a charging request from a vehicle. In one embodiment, the charging station 102*a* in FIG. 1 is in a discovery mode and broadcasts its charging station identification sequence in identification packets through its communication module, such as the one in the control module 512 of the power supply unit 506 in FIG. 5. In one embodiment, the broadcasted identification packets from the charging station 102*a* comprise the clock information and a general identity access code of the charging station 102*a*. In one embodiment, the charging station may send its identification packets in even slots and waits for response in odd slots. At the same time, the vehicle is in an inquiry scan mode and may receive at least one identification packet broadcasted from the charging station 102*a*. In one embodiment, the vehicle 508 may receive at least one identification packet and respond with an inquiry response message. The inquiry response message may further comprise the address and clock information of the vehicle 508.

Following the block 1102, wherein the charging station 102*a* accepts a charging request from the vehicle 508, it may start charging the vehicle 508 as shown in 1104. During the charging process, before sending the power to the vehicle 508, the charging station 102*a* may adjust and pair its base pad 510 to the vehicle pad 524 of the vehicle 508, wherein the method of adjusting and paring the vehicle pad 524 comprises adjusting the relative position of the base pad 510 and communicating with the control 514 of the vehicle 508. The communication between the vehicle 508 and the charging station 102*a* may comprise exchanging additional information for authentication, authorization or billing. It may further comprise exchanging the information of necessary charging parameters.

Figure 12:
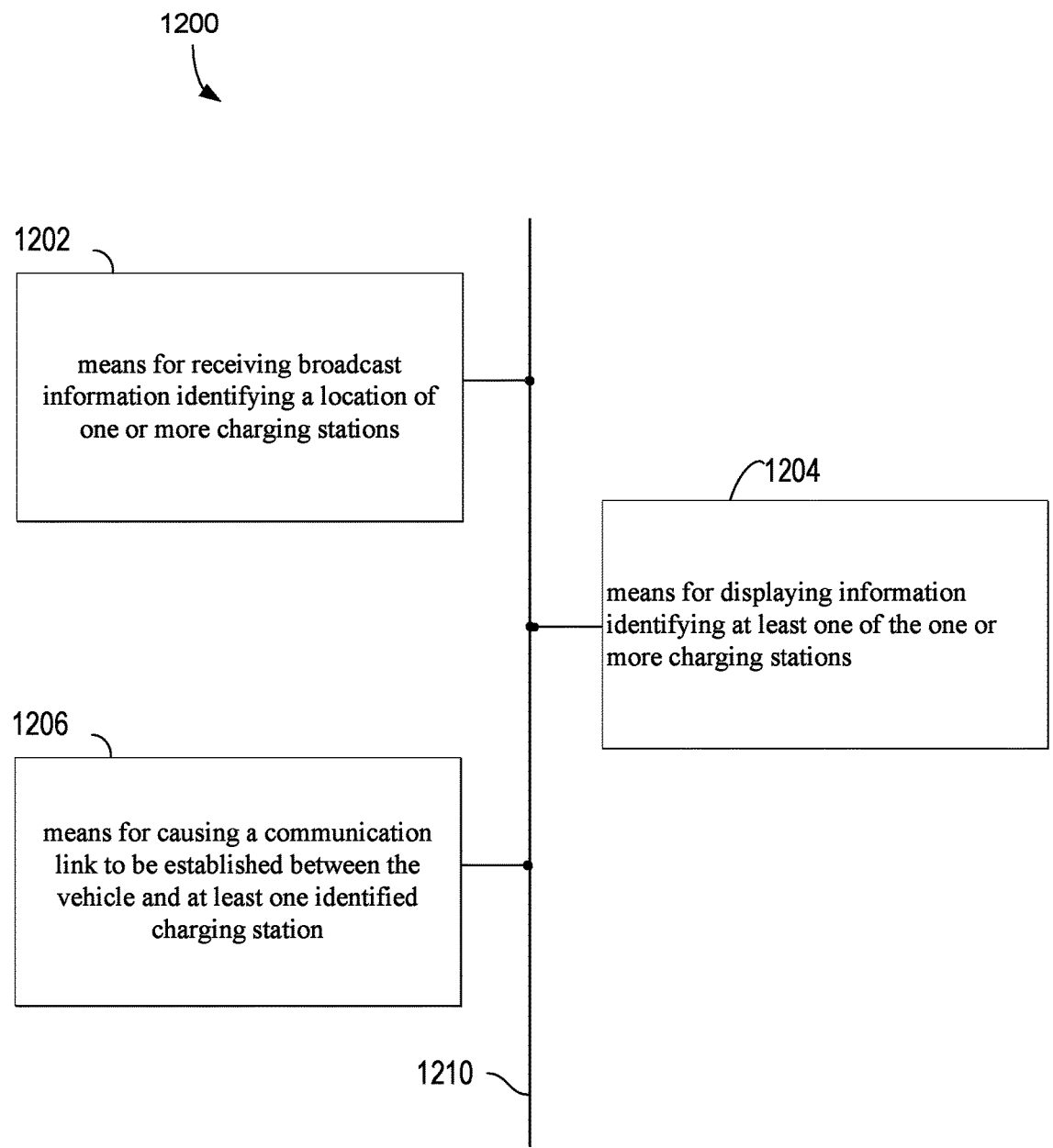
FIG. 12 illustrates a functional diagram of an exemplary apparatus for receiving wireless power from a charging station.

FIG. 12 illustrates a diagram of an apparatus for receiving wireless power from a charging station 102*a*. In one embodiment, the means for receiving broadcast information identifying a location of one or more charging stations 1202 comprises the antenna 614 and the controller 606 of FIG. 6. The means for displaying information identifying at least one of the one or more charging stations 1204 comprises the display and logging unit 602, the interface control unit 604 and the controller 606 of FIG. 6. Means for causing a communication link to be established between the vehicle and at least one identified charging station 1006 comprises the controller 606, the vehicle pad 608 of FIG. 6 and the charging station 102a of FIG. 1.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the application.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the applications have been described herein. It is to be understood that not necessarily all such advantages may be achieved in accordance with any particular embodiment of the application. Thus, the application may be embodied or carried out in a manner that achieves or optimizes one advantage or group of advantages as taught herein without necessarily achieving other advantages as may be taught or suggested herein.

Various modifications of the above described embodiments may be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. An apparatus for parking a vehicle having a vehicle pad to receive a wireless charge from a charging system disposed in a plurality of parking spaces and having a plurality of charging stations each having a base pad, each parking space including one of the wireless charging stations, the apparatus comprising:
   an antenna circuit configured to wirelessly receive information identifying a location of at least two of the wireless charging stations that are within a communication range of the vehicle pad and with which the vehicle pad is able to establish a wireless communication link;
   a user interface configured to:
      display information identifying the at least two wireless charging stations; and
      receive a selection of a wireless charging station from the at least identified two wireless charging stations via the user interface; and
   a controller configured to:
      determine that the vehicle is positioned within the parking space of the selected wireless charging station to receive the wireless charge at a level sufficient to charge the vehicle, and
      cause the wireless communication link to be established between the vehicle pad of the vehicle and the base pad of the selected wireless charging station based on the determination that the vehicle is positioned within the parking space of the selected wireless charging station.

2. The apparatus of claim 1, wherein each of the at least two wireless charging stations are positioned at least one of in a common parking area or substantially proximate to each other.

3. The apparatus of claim 1, wherein the displayed information comprises one or more selection options related to one or more parking spaces.

4. The apparatus of claim 1, wherein the displayed information comprises at least one portion of identification information of the at least two identified wireless charging stations.

5. The apparatus of claim 1, wherein the controller is further configured to exchange control and data information with at least one of the vehicle or the at least two identified charging stations.

6. The apparatus of claim 5, wherein the controller further comprises a wireless communication module configured to identify at least one of the at least two wireless charging stations and to broadcast a predefined identification sequence that is recognizable by the at least two identified wireless charging stations.

7. The apparatus of claim 1, wherein the controller is further configured to set a wireless charging station identification sequence of the at least two identified charging stations as default, and wherein the default is applied if no other option has been selected within a predefined period of time.

8. The apparatus of claim 1, wherein the controller is further configured to measure an alignment score, the alignment score indicating how close the vehicle pad is next to the base pad.

9. The apparatus of claim 1, wherein the information identifying a location of the at least two wireless charging stations further comprises at least:
a space number identifying a parking space, wherein at least one of the at least two wireless charging stations is located in the identified parking space; and
a location of the identified parking space.

10. The apparatus of claim 1, wherein the controller is further configured to receive information identifying availability of the two or more wireless charging stations, wherein the availability of the two or more wireless charging stations is indicated through receiving at least one wireless charging station identification sequence broadcasted by each of the at least two wireless charging stations in a discovery mode.

11. The apparatus of claim 1, wherein the vehicle pad is configured to wirelessly receive a charge from the at least two identified wireless charging stations.

12. The apparatus of claim 1, wherein the controller is further configured to store the received information.

13. The apparatus of claim 1, wherein the user interface is further configured to log an input from a user.

14. The apparatus of claim 1, wherein the controller is further configured to page the at least two identified wireless charge stations.

15. The apparatus of claim 11, wherein the controller is configured to receive, via the wireless communication link, a selection confirming the selected wireless charging station for wirelessly transferring the charge to the charging pad.

16. The apparatus of claim 1, wherein the information is communicated directly between the antenna and each wireless charging station of the at least two wireless charging stations.

17. The apparatus of claim 1, wherein the user interface is further configured to receive a second selection of a second wireless charging station from the at least two identified wireless charging stations via the user interface after the selection of the selected wireless charging station.

18. The apparatus of claim 17, wherein the controller is further configured to cause a second wireless communication link to be established between the vehicle and the second wireless charging station selected via the user interface.

19. The apparatus of claim 17, wherein the controller is further configured to disconnect the wireless communication link between the vehicle and the selected wireless charging station.

20. The apparatus of claim 19, wherein the controller is further configured to disconnect the wireless communication link after an expiration of a time period.

21. A method of parking a vehicle having a vehicle pad to receive a wireless charge from a charging system disposed in a plurality of parking spaces and having a plurality of charging stations each having a base pad, each parking space including one of the wireless charging stations, the method comprising:
receiving wireless information identifying a location of at least two of the wireless charging stations that are within a communication range of the vehicle pad and with which the vehicle pad is able to establish a wireless communication link;
displaying information identifying the at least two wireless charging stations;
receiving a selection of a wireless charging station from the at least two identified wireless charging stations via the user interface;
determining that the vehicle is positioned within the parking space of the selected wireless charging station to receive the wireless charge at a level sufficient to charge the vehicle; and
causing an establishment of the wireless communication link between the vehicle pad of the vehicle and the base pad of the selected wireless charging station based on the determination that the vehicle is positioned within the parking space of the selected wireless charging station.

22. The method of claim 21, wherein each of the at least two wireless charging stations are positioned at least one of in a common parking area or substantially proximate to each other.

23. The method of claim 21, wherein displaying information comprises displaying one or more selection options related to one or more parking spaces via a user interface.

24. The method of claim 21, wherein displaying information comprises displaying at least a portion of identification information of the at least two identified wireless charging stations.

25. The method of claim 21, further comprises exchanging control and data information with at least one of the vehicle or the at least two wireless charging stations via a communication module.

26. The method of claim 25, wherein exchanging control and data information further comprises:
identifying at least one of the at least two wireless charging stations; and
broadcasting an identification sequence of the vehicle that is recognizable by the at least two identified wireless charging stations.

27. The method of claim 26, wherein exchanging control and data information further comprises pairing the communication module with at least one of the at least two identified wireless charging stations.

28. The method of claim 27, wherein pairing the communication module with the at least one of the at least two identified wireless charging stations comprises pairing the communication module with the at least one of the at least two identified wireless charging stations through a wireless link and a known passcode.

29. The method of claim 21, further comprising setting a wireless charging station identification sequence of the at least two identified wireless charging stations as default via a controller, wherein the default is applied if no other option has been selected within a predefined period of time.

30. The method of claim 21, wherein causing the establishment of the wireless communication link further comprises measuring an alignment score, the alignment score indicating how close the vehicle pad is above the base pad.

31. The method of claim 21, wherein the wireless information identifying a location of the at least two wireless charging stations further comprises at least:
   a space number identifying a parking space, wherein at least one of the at least two wireless charging stations is located in the identified parking space; and
   a location of the identified parking space.

32. The method of claim 21, further comprising receiving information identifying availability of the at least two wireless charging stations, wherein the availability of the at least two wireless charging stations is indicated through receiving at least one wireless charging station identification sequence broadcasted by each of the at least two wireless charging stations in a discovery mode.

33. The method of claim 21, further comprising receiving a charge from at least one of the at least two identified wireless charging stations.

34. The method of claim 21, further comprising storing the received information via a controller.

35. The method of claim 21, further comprising logging an input from a user via a user interface.

36. The method of claim 21, further comprising paging the at least two identified wireless charging stations.

37. The method of claim 33, further comprising receiving, via the wireless communication link, a selection confirming the selected wireless charging station for wirelessly transferring the charge to the charging pad.

38. The method of claim 21, wherein the information is communicated directly between the antenna and each wireless charging station of the at least two wireless charging stations.

39. The method of claim 21, further comprising receiving a second selection of a second wireless charging station of the at least two wireless charging stations via the user interface after the selection of the selected wireless charging station.

40. The method of claim 39, further comprising causing an establishment of a second wireless communication link between the vehicle and the second wireless charging station selected via the user interface.

41. The method of claim 39, further comprising disconnecting the wireless communication link between the vehicle and the selected wireless charging station.

42. The method of claim 39, wherein disconnecting the wireless communication link between the vehicle and the selected wireless charging station comprises disconnecting the wireless communication link after an expiration of a time period.

\* \* \* \* \*